United States Patent [19]

Matsuse

[11] Patent Number: 4,580,205
[45] Date of Patent: Apr. 1, 1986

[54] CURRENT-TYPE GTO INVERTER USING GTO IN ITS SURGE VOLTAGE CLAMPING CIRCUIT

[75] Inventor: Kohki Matsuse, Tama, Japan

[73] Assignee: Kabushiki Kaisha Meidensha, Tokyo, Japan

[21] Appl. No.: 587,642

[22] Filed: Mar. 8, 1984

[30] Foreign Application Priority Data

Mar. 11, 1983 [JP] Japan .................................. 58-40096

[51] Int. Cl.⁴ ............................................. H02M 5/45
[52] U.S. Cl. ...................................... 363/37; 363/58; 363/137
[58] Field of Search .................... 363/37, 58, 136–138; 318/803, 811

[56] References Cited

U.S. PATENT DOCUMENTS 3,887,862  6/1975  Hubner .
4,309,751  1/1982  Okado ................................. 363/138
4,482,854 11/1984  Kawada et al. ....................... 363/58

FOREIGN PATENT DOCUMENTS 2315193  2/1977  France ................................ 363/138
52-144738 12/1977  Japan .
71174  5/1980  Japan ................................... 363/37
1429880  6/1973  United Kingdom .

OTHER PUBLICATIONS

Burgum et al., "A New Gate Turn-Off Switch (GTO) Used in a P.W.M. A.C. Motor Drive," Conference: Proceedings of the First Annual International MOTORCON '81 Conference, Chicago, Ill., U.S.A. (Jun. 10-13, 1981), pp. 483-491.

Primary Examiner—William H. Beha, Jr.
Attorney, Agent, or Firm—Schwartz, Jeffery, Schwaab, Mack, Blumenthal & Evans

[57] ABSTRACT

In a current type GTO inverter, commutation surge voltage is inevitably generated from an inductive load whenever each GTO is turned off. The commutation surge voltage thus generated is once stored in a capacitor through a diode surge voltage rectifier and then restored or regenerated to the DC source terminals of the GTO bridge-connected inverter through a pair of other GOTS turned on only when the capacitor voltage exceeds a predetermined value beyond the DC source voltage. After energy restoration, magnetic energy stored in a reactor is recharged in the same capacitor. The necessary elements are a capacitor, two GTOs, two diodes and a DC reactor, thus simplifying the circuit configuration and reducing the cost. Additionally, since no vibration circuits to turn off thyristors for restoring the energy charged in the capacitor to the GTO bridge-connected inverter are required, the circuit operation is stable at higher frequency range, in particular.

1 Claim, 3 Drawing Figures

CURRENT-TYPE GTO INVERTER USING GTO IN ITS SURGE VOLTAGE CLAMPING CIRCUIT

BACKGROUND OF THE INVENTION

1. Field of the Invention

The present invention relates generally to a current type GTO (gate turn-off thyristor) inverter, and more specifically to a surge voltage clamping circuit for clamping the surge voltage generated when each GTO incorporated in a current type GTO bridge-connected inverter is turned off. The clamped surge voltage is stored once in a capacitor and then returned to the terminals between the rectifier and the GTO inverter for energy restoration.

2. Description of the Prior Art

In a current-type gate turn-off thyristor bridge-connected inverter, since gate turn-off thyristors (referred to as GTOs, simply hereinafter) are incorporated in the inverter as the main switching elements, no commutating circuit including a commutation reactor, for instance, is required, because the GTO can be turned from on to off or vice versa in response to a control signal applied to the gate terminal thereof. Here, the terminology "commutation" means that the load current of one phase is switched to that of another phase or vice versa by thyristor switching operation. In the abovementioned current-type GTO inverter, however, in the case where a load such as an induction motor having an inductance is coupled, commutation surge voltages are inevitably generated whenever each GTO is turned off. The generated surge voltages are superimposed upon the alternating output voltage of the GTO inverter, thus resulting in a problem in that some of the GTOs may be damaged by these commutation surge voltages.

In order to overcome the above problem, a commutation surge voltage clamping circuit has been proposed, by which the commutation surge voltages generated whenever each GTO is turned off are absorbed or stored in a single electrolytic capacitor and thereafter returned to the load side through the GTO inverter for reducing the electric power loss. This function is called energy restoration.

In the conventional commutation surge voltage clamping circuit used for a current type GTO inverter, however, there exist some disadvantages as follows:

(1) Since a pair of ordinary thyristors are used for restoring the stored commutation surge voltage energy to the DC source terminals of the GTO inverter, two vibration circuits or thyristor turning-off circuit including a capacitor and an inductor are necessary. Further, since the surge voltage energy is restored through these capacitors used for the vibration circuits, the capacity of these capacitors of the vibration circuits is determined to be relatively large. As a result, the turn-off operation of the ordinary thyristors often fails at a higher frequency range. In other words, it is impossible to stably operate the commutation surge voltage clamping circuit when the GTO inverter operates at a high speed.

(2) Since the commutation surge voltage energy is restored from the electrolytic capacitor to the DC source terminals of the GTO inverter through the vibration capacitors connected in series with the electrolytic capacitor, the capacitance of the restoring circuit is relatively large. Therefore, a reactor having a large inductance is necessary in order to smooth the current restored to the GTO inverter. In other words, the cost of the commutation surge voltage clamping circuit is relatively high.

A more detailed description of the prior-art commutation surge voltage clamping circuit will be made with reference to the attached drawings under DESCRIPTION OF THE PREFERRED EMBODIMENT.

SUMMARY OF THE INVENTION

With these problems in mind, therefore, it is a primary object of the present invention to provide a surge voltage clamping circuit for a current type GTO inverter which can operate stably at high frequency range.

It is the other object of the present invention to provide a surge voltage clamping circuit for a current type GTO inverter in which no vibration circuit for turning off the energy-restoring thyristor is provided without use of a large-inductance reactor, and therefore the circuit configuration is simplified.

To achieve the above-mentioned object, a surge voltage clamping circuit for a current type GTO inverter according to the present invention comprises (a) a diode bridge-connected commutation surge voltage rectifier, (b) a capacitor for storing commutation surge voltage energy, (c) a cumulative reactor, (d) a first gate turn-off thyristor, (e) a second gate turn-off thyristor, (f) a first diode, (g) a second diode, and (h) a DC reactor. In the circuit configuration thus constructed, the commutation surge voltage energy stored in the capacitor is restored to the DC source terminals of the GTO inverter through the first and second gate turn-off thyristors when the charged-up capacitor voltage exceeds a predetermined value beyond the DC source voltage, and additionally the magnetic energy stored in the reactor is recharged to the capacitor through the first and second diodes after the two gate turn-off thyristors have been turned off.

Further, to achieve the above-mentioned object, the method of restoring the commutation surge voltage to the DC source terminals of the GTO inverter according to the present invention comprising the following steps of:

(a) rectifying the commutation surge voltage generated when each thyristor of the inverter is turned off;
(b) storing the commutation surge voltage energy in a capacitor;
(c) comparing the stored commutation surge voltage with a voltage of DC source;
(d) if the stored commutation surge voltage exceeds a predetermined value beyond the DC source voltage, restoring the stored commutation surge voltage energy to the DC source terminals of the GTO inverter through a DC reactor and gate turn-off thyristors; and
(e) if the stored commutation surge voltage drops to a predetermined value below the DC source voltage, recharging a magnetic energy stored in the reactor to the capacitor through diodes.

BRIEF DESCRIPTION OF THE DRAWINGS

The features and advantages of a surge voltage clamping circuit for current-type GTO inverter according to the present invention over the prior art clamping circuit will be more clearly appreciated from the following description of the preferred embodiment of the invention taken in conjunction with the accompanying drawings in which like reference numerals designate the same or similar elements or sections throughout the figures thereof and in which.

DETAILED DESCRIPTION OF THE PREFERRED EMBODIMENT

To facilitate understanding of the present invention, a reference will be made to an example of prior-art surge voltage clamping circuits for a current type GTO bridge-connected inverter, with reference to the attached drawings.

Figure 1:
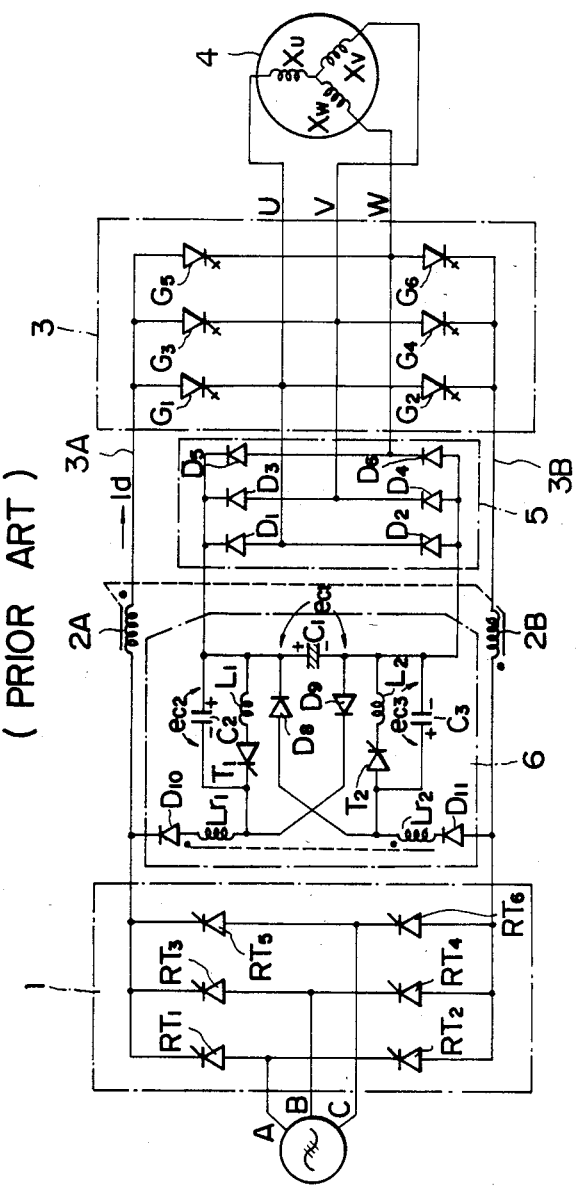
FIG. 1 is a circuit diagram of a prior-art surge voltage clamping circuit for a current-type GTO inverter.

With reference to FIG. 1, the GTO inverter provided with a surge voltage clamping circuit is roughly made up of a thyristor bridge-connected current rectifier 1, a DC reactor having two inductive reactances 2A and 2B magnetically connected each other, a GTO (gate turn-off thyristor) bridge-connected inverter 3, an induction motor 4, a diode bridge-connected commutation surge voltage rectifier 5, and a commutation surge voltage clamping circuit 6 including an electrolytic capacitor $C_1$. The above clamping circuit 6 functions also as a commutation surge voltage energy restoring circuit.

The thyristor bridge-connected rectifier 1 includes six rectifying thyristors $RT_1$ to $RT_6$, which are turned on sequentially in the order of $RT_1$ and $RT_6$, $RT_3$ and $RT_2$ and $RT_5$ and $RT_4$ so that each half cycle of the sine wave of a three-phase power source can be passed in sequence. Therefore, when the rectifying thyristors $RT_1$ and $RT_6$ are both turned on, a first-phase current is supplied from the terminal A to the terminal C by way of thyristor $RT_1$, reactor 2A, terminal 3A, GTO bridge-connected inverter 3, motor 4, GTO bridge-connected inverter 3, terminal 3B, reactor 2B, and thyristor $RT_6$. Similarly, when the rectifying thyristors $RT_3$ and $RT_2$ are both turned on, a second-phase current is supplied from the terminal B to the terminal A by way of rectifying thyristor $RT_3$, reactor 2A, terminal 3A, GTO bridge-connected inverter 3, motor 4, GTO bridge-connected inverter 3, terminal 3B, reactor 2B and the rectifying thyristor $RT_2$; when the rectifying thyristors $RT_5$ and $RT_4$ are turned on, a third phase current is supplied from the terminal C to the terminal B by way of the rectifying thyristor $RT_5$, reactor 2A, terminal 3A, GTO bridge-connected inverter 3, motor 4, GTO bridge-connected inverter 3, terminal 3B, reactor 2B, and rectifying thyristor $RT_4$. The rectified full-wave direct current is further smoothed through the DC cumulative reactor having two inductances 2A and 2B magnetically connected each other. Therefore, the smoothed direct current Id is further converted into an alternate current of an appropriate frequency through the GTO inverter 3 to drive the induction motor 4 at any desired speed.

The GTO inverter 3 includes six bridge-connected GTOs $G_1$ to $G_6$. When the GTOs are turned on in the order of $G_1$ and $G_6$ and then $G_3$ with $G_6$ on in sequence for each 60 degrees, an alternate square-wave U-phase current $i_u$ with a pulse width of 60 degrees is first obtained by the GTO inverter. When the GTOs are turned on in the order of $G_3$ and $G_6$ and then $G_2$ with $G_3$ on in sequence for each 60 degrees, an alternate square-wave V-phase current $i_v$ with a pulse width of 120 degrees is obtained by the GTO inverter. When the GTOs are turned on in the order of $G_3$ and $G_2$ and then $G_5$ with $G_2$ on in sequence for each 60 degrees, an alternate square-wave W-phase current $i_w$ with a pulse width of 120 degrees is obtained by the GTO inverter.

In other words, when GTOs $G_1$ and $G_6$ are turned on, the rectified direct current Id flows as the U-phase current (the latter half of 120 degrees) $i_u$ through the first U-phase winding having reactance $X_u$ and the third W-phase winding having reactance $X_w$ of the motor. When GTO $G_1$ is turned off and GTO $G_3$ is turned on with GTO $G_6$ kept turned on, the current Id flows as the V-phase current (the first half of 120 degrees) $i_v$ through the second V-phase winding having reactance $X_v$ and the third W-phase winding having reactance $X_w$.

Similarly, when $G_6$ is turned off and $G_2$ is turned on with $G_3$ kept turned on, the current Id flows as the V-phase current (the latter half of 120 degrees) $i_v$ through $X_v$ and $X_u$. When $G_3$ is turned off and $G_5$ is turned on with $G_2$ kept turned on, the current Id flows as the W-phase current (the first half of 120 degrees) $i_w$ through $X_w$ and $X_u$.

In summary, GTOs are turned off in the order of $G_1$, $G_6$, $G_3$, $G_2$, $G_5$ and $G_4$ for each 60 degrees. The current passed through these three-phase windings having motor reactances $X_u$, $X_v$, and $X_w$ generates a rotational magnetic flux.

Whenever each of these three-phase windings is switched off, commutation surge voltages are inevitably generated by the magnetic energy stored in the respective windings. In order to absorb these commutation surge voltages, there is additionally provided a surge voltage clamping circuit including a diode bridge-connected commutation surge voltage rectifying section 5 made up of six diodes $D_1$ to $D_6$ and a surge voltage clamping section 6 made up of an electrolytic capacitor $C_1$, two capacitors $C_2$ and $C_3$, two ordinary thyristors $T_1$ and $T_2$, four diodes $D_8$ to $D_{11}$, two turning-off inductors $L_1$ and $L_2$, and a reactor having two reactances $L_{r1}$ and $L_{r2}$, as shown in FIG. 1. In the above reactor, the positive side of the first reactance $L_{r1}$ is connected to the positive terminal of the DC rectifier 1 through the diode $D_{10}$; the negative side of the second reactance $L_{r2}$ is connected to the negative terminal of the DC rectifier through the diode $D_{11}$, respectively.

The operation of the prior-art surge voltage clamping circuit will be described hereinbelow with reference to FIGS. 1 and 2.

Figure 2:
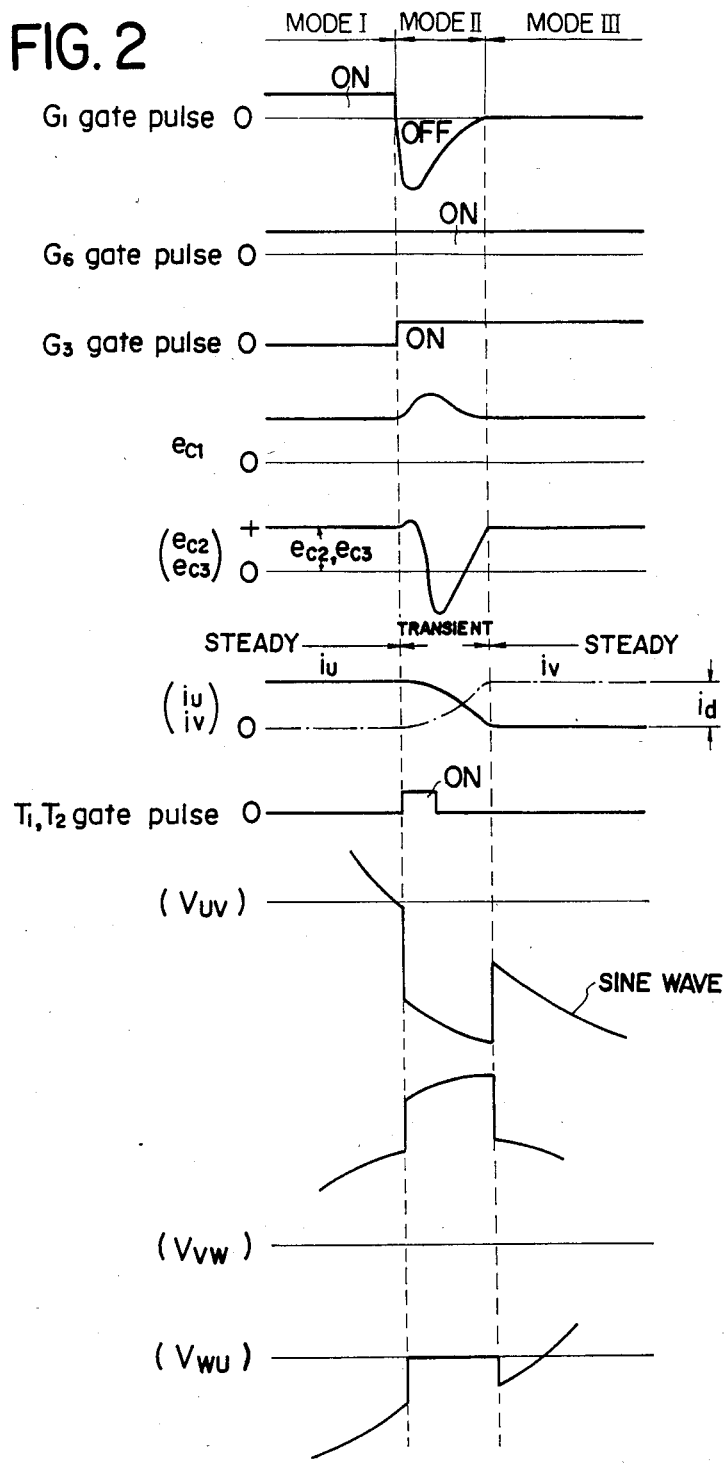
FIG. 2 is a timing chart of the prior-art surge voltage clamping circuit for a current-type GTO inverter shown in FIG. 1, for assistance in explaining the operation thereof.

When mode I ($G_1$ and $G_6$ are on) is switched to mode II ($G_1$ is off, $G_6$ is on, $G_3$ is on), for instance, as depicted in FIG. 2, the current $i_u$ flowing through windings $X_u$ and $X_w$ is commutated to the current $i_v$ flowing through windings $X_v$ and $X_w$. In this transient state, the current $i_u$ does not immediately fall to zero level but decreases gradually and the current $i_v$ does not immediately rise to the current Id but increases gradually as depicted in FIG. 2. This is because there exists each inductance in each winding and thereby an induced surge voltage is inevitably generated across each winding. It is very important to suppress or eliminate these induced surge voltages for protection of GTO thyristors.

An induced surge voltage $V_{vw}$ developed across the windings $X_v$ and $X_w$ in this transient state can be charged in the capacitor $C_1$ as follows: When the surge voltage $V_{vw}$ exceeds the voltage across the capacitor $C_1$, since the diodes $D_3$ and $D_6$ are both forward biased (the anode of $D_3$ is high in voltage level; the cathode of $D_6$ is low in voltage level), the major part of the current to be passed through the winding $X_v$ flows by way of GTO $G_3$, diode $D_3$, capacitor $C_1$, diode $D_6$ and GTO $G_6$. In this transient state, the surge voltage $V_{vw}$ is suppressed by the capacitor $C_1$ if the voltage $e_{cl}$ across the capacitor $C_1$ is sufficiently low.

Simultaneously, when an induced surge voltage $V_{uv}$ developed across the windings $X_u$ and $X_v$ in this transient state falls to the voltage $e_{cl}$ of the capacitor $C_1$, since the diode $D_3$ and $D_2$ are both forward biased (the cathode of $D_2$ is low in voltage level and anode of $D_3$ is high in voltage level), the commutation energy generated across the windings $x_u$ and $X_v$ is charged into the capacitor $C_1$ by way of GTO $G_3$, diode $D_3$, capacitor $C_1$, diode $D_2$, winding $X_u$, winding $X_w$ and GTO $G_6$. In this transient state, the surge voltage $V_{uv}$ is suppressed by the capacitor $C_1$. As a result, the induced surge voltage $V_{wu}$ developed across the windings $X_w$ and $X_u$ becomes zero as shown in FIG. 2. The current $i_v$ increases gradually up to the direct current Id in accordance with a time constant determined by the circuit constant of the motor load. When the current $i_u$ reaches zero, the diode $D_2$ is cut off. Simultaneously, no induced surge voltage is generated in the winding $X_u$. When the induced surge voltage $V_{vw}$ falls below the capacitor voltage $e_{cl}$, the diodes $D_3$ and $D_6$ are both cut off, so that the capacitor $C_1$ is electrically disconnected from the inverter 3 and thus the commutation from GTO $G_1$ to GTO $G_3$ is completed.

The above-mentioned mode II corresponds to the overlapped (transient) period in a series-connected diode type current inverter. However, there still exists a difference between the GTO inverter shown in FIG. 1 and the series-connected diode type current inverter in that two transient currents flow through the each-phase winding in the directions opposite to each other being superimposed upon each other.

When the charged-up voltage $e_{cl}$ in the capacitor $C_1$ increases sufficiently, the two reverse blocking ordinary thyristors $T_1$ and $T_2$ are turned on in response to a pulse applied to each gate terminal thereof. Therefore, the surge voltage energy stored in the capacitor $C_1$ is discharged to the DC source terminals 3A and 3B of the GTO inverter 3 by way of inductor $L_1$, thyristor $T_1$, reactor $Lr_1$, diode $D_{10}$, reactor 2A, GTO inverter 3, motor 4, GTO inverter 3, reactor 2B, diode $D_{11}$, reactor $Lr_2$, thyristor $T_2$, and inductor $L_2$. The above-mentioned discharge is called commutation surge voltage energy restoration or energy rebound. In this initial state of discharge, the capacitors $C_2$ and $C_3$ are also charged up with the polarity as shown in FIG. 1. These two capacitors $C_2$ and $C_3$ form two vibration circuits independently. The first vibration circuit is made up of the capacitor $C_2$ and the inductor $L_1$; the second vibration circuit is made up of the capacitor $C_3$ and the inductor $L_2$, each having a relatively high frequency or a relatively small time constant. An example of the voltage wave form $e_{c2}$ or $e_{c3}$ across the capacitor $C_2$ or $C_3$ is also shown in FIG. 2. When the polarity of the capacitor $C_2$ or $C_3$ of the vibration circuit is reversed, the thyristor $T_1$ or $T_2$ is automatically turned off, because a positive potential is applied to the anode of the thyristor $T_1$ or $T_2$. In this state, it should be noted that the polarity of the charged-up voltages of the three capacitors $C_1$, $C_2$, $C_3$ are the same, that is, three charged-up voltages are added to each other. Therefore, when the addition of these three charged-up voltages exceeds the DC source voltage across the thyristor bridge rectifier 1, the energy stored in these three capacitors $C_1$, $C_2$ and $C_3$ are returned to the DC source terminals 3A and 3B by way of the reactor $Lr_1$, diode 10, reactor 2A, GTO inverter 3, motor 4, GTO inverter 3, reactor 2B, diode $D_{11}$ and the reactor $Lr_2$. In this energy restoration operation, since the inductance $Lr_1$ or $Lr_2$ of the reactor is so determined as to be sufficiently greater than that of the turning-off (vibration) inductor $L_1$ or $L_2$, the two vibration circuits $L_1.C_2$ and $L_2.C_3$ can stably vibrate and provide an sufficient turn-off time for the thyristor $T_1$ or $T_2$. In other words, the reactor $Lr_1$ or $Lr_2$ functions as a smoothing element. After the surge voltage energy has been discharged, the apacitors $C_2$ and $C_3$ are charged again in the direction as shown in FIG. 1, to the voltage level roughly the same as the voltage $e_{cl}$ across the capacitor $C_1$, because three capacitors $C_1$, $C_2$, and $C_3$ are connected in series.

In this state, since the capacitance of capacitor $C_1$ is determined to be sufficiently great as compared with that of the capacitors $C_2$ or $C_3$, after the capacitors $C_2$ and $C_3$ have been charged up, the magnetic energy stored in the reactor $Lr_1$ or $Lr_2$ is recharged into the capacitor $C_1$ by way of diode $D_{11}$, reactor $Lr_2$, diode $D_8$, capacitor $C_1$, diode $D_9$, reactor $Lr_1$ and diode $D_{10}$. This energy is unavailable reactive power by nature. After the reactor energy has been recharged into the capacitor $C_1$, the two diodes $D_{10}$ and $D_{11}$ are both returned to its off state, respectively, that is, to the initial conditions. Therefore, the electric discharge of the capacitor $C_2$ or $C_3$ is prevented for being ready for the succeeding commutation of the GTO bridge-connected inverter 3. After the GTO $G_1$ has been turned off and the GTO $G_3$ has been turned on, that is, the commutation has been completed from $G_1$ to $G_3$, the operation mode shifts to the mode III in which the driving current is supplied from GTO $G_3$, through windings $X_v$ and $X_w$, to GTO $G_6$.

In the prior-art surge voltage clamping circuit for a current-type GTO inverter described above, however, there exist some disadvantages as follows:

(1) The turning-off inductors $L_1$ and $L_2$ and the turning-off capacitors $C_1$ and $C_2$ are required for forming two vibration circuits in order to turn off the ordinary thyristors $T_1$ and $T_2$ after the surge voltage energy stored in the capacitor $C_1$ has been restored to the DC source terminals of the GTO inverter 3. Additionally, the commutation energy is restored to the GTO inverter 3 mainly through the capacitors $C_2$ and $C_3$. Therefore, in order to sufficiently restore the stored surge voltage energy even under a heavy load, the capacitance of $C_2$ or $C_3$ should be relatively large. When capacitors having a large capacitance are used, the vibration frequency becomes low, thus resulting in turn-off failure of the ordinary thyristors $T_1$ and $T_2$. In other words, it is impossible to stably operate the surge voltage clamping circuit at a high frequency range when a heavy load is applied to the induction motor.

(2) Since the added charged-up voltage of the series-connected capacitors $C_1$, and $C_2$, and $C_3$ is restored to the GTO inverter 3 through the cumulative reactor having reactances $Lr_1$ and $Lr_2$, a large inductance is required for this reactor. Otherwise, current overshoot may be generated. In other words, the cost of the reactor $Lr_1$ and $Lr_2$ is relatively expensive.

Figure 3:
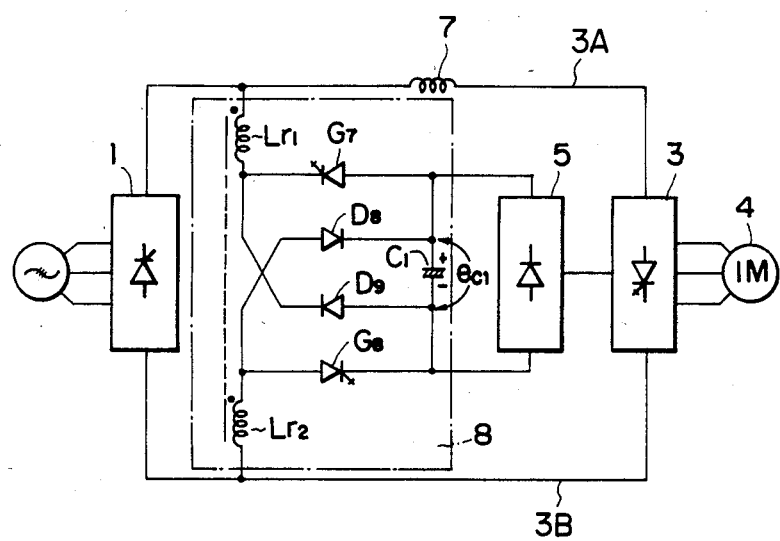
FIG. 3 is a circuit diagram of the surge voltage clamping circuit for a current-type GTO inverter according to the present invention.

In view of the above description, reference is now made to an embodiment of a surge voltage clamping circuit for a current-type GTO inverter according to the present invention with reference to FIG. 3. In this embodiment, GTOs are incorporated in the surge voltage clamping circuit, without providing turning-off (vibration) circuit, in order to operate the circuit stably at a high speed.

In FIG. 3, the points different from the prior-art surge voltage clamping circuit shown in FIG. 1 are that (1) a single direct-current reactor 7 is incorporated in place of the cumulative direct-current reactors 2A and 2B and (2) two gate turn-off thyristors (GTOs) $G_7$ and $G_8$ are incorporated without providing the vibration circuits including two inductors $L_1$ and $L_2$ and capacitors $C_2$ and $C_3$.

A surge voltage clamping circuit 8 or a surge energy restoring circuit according to the present invention comprises an electrolytic capacitor $C_1$ for absorbing the commutation surge voltage energy, two GTOs $G_7$ and $G_8$ for restoring the surge voltage energy stored in the capacitor $C_1$ to the GTO inverter 3, a cumulative reactor having two inductive reactances $Lr_1$ and $Lr_2$ magnetically connected to each other for smoothing the current restored from the capacitor $C_1$ to the GTO inverter 3, and two diodes $D_8$ and $D_9$ for storing the magnetic energy stored in the reactor $Lr_1$, $Lr_2$ to the capacitor $C_1$ after the surge voltage energy stored in the capacitor $C_1$ has been restored.

The electrolytic capacitor $C_1$ is connected in parallel with the diode bridge-connected commutation surge voltage rectifier 5. The two GTOs are connected between the reactor $Lr_1$ and $Lr_2$ and the capacitor $C_1$ as follows: The positive side of the first winding $Lr_1$ is connected to the positive terminal of the DC source; the negative side of the first winding $Lr_1$ is connected to the cathode of the first GTO $G_7$; the anode of the first GTO $G_7$ is connected to the positive side of the capacitor $C_1$; the negative side of the second winding $Lr_2$ is connected to the negative terminal of the DC source; the positive side of the second winding $Lr_2$ is connected to the anode of the second GTO $G_8$; the cathode of the second GTO $G_8$ is connected to the negative side of the capacitor $C_1$, respectively, respectively.

Further, the two diodes $D_8$ and $D_9$ are connected between the reactor $Lr_1$ and $Lr_2$ and the capacitor $C_1$ as follows: the cathode of the first diode $D_8$ is connected to the positive side of the capacitor $C_1$; the anode of the first diode $D_8$ is connected to the positive side of the second winding $Lr_2$; the cathode of the second diode $D_9$ is connected to the negative side of the first winding $Lr_1$ and the anode of the second diode $D_9$ is connected to the negative side of the capacitor $C_1$.

The GTOs $G_7$ and $G_8$ are turned on when the voltage $e_{cl}$ developed across the capacitor $C_1$ exceeds a predetermined value beyond the DC source voltage developed across the thyristor bridge rectifier 1. Therefore, the GTOs $G_7$ and $G_8$ are not turned on whenever the GTO inverter 3 is commutated, being different from the prior-art surge voltage clamping circuit shown in FIG. 1. In other words, the energy stored in the capacitor $C_1$ is restored or regenerated without synchronization with the commutation of the GTO inverter 3.

The operation of the surge voltage clamping circuit 8 accoding to the present invention will be described hereinbelow. When surge voltage is generated by the commutation of the GTO inverter 3, the surge voltage energy is charged into the electrolytic capacitor $C_1$ through the diode bridge rectifier 5 with the polarity as shown in FIG. 3. If the voltage level of the capacitor $C_1$ exceeds a predetermined value beyond the DC voltage of the thyristor bridge rectifier 1, the GTOs $G_7$ and $G_8$ are turned on by a gate circuit (not shown). Therefore, the surge voltage energy stored in the capacitor $C_1$ is restored to the DC source terminals 3A and 3B of the GTO inverter 3 by way of GTO $G_7$, first winding $Lr_1$, DC reactor 7, GTO inverter 3, motor 4, GTO inverter 3, second winding $Lr_2$, and GTO $G_8$. When the voltage level of the capacitor $C_1$ drops to a predetermined value below the DC voltage of the thyristor bridge rectifier 1 due to this energy restoration, the gate circuit turns off the GTOs $G_7$ and $G_8$ simultaneously. Then, the magnetic energy stored in the first and second windings $Lr_1$ and $Lr_2$ is supplied to the capacitor $C_1$ to charge it by way of second winding $Lr_2$, diode $D_8$, capacitor $C_1$, diode $D_9$ and first winding $Lr_1$ in the forward direction of the two diodes $D_8$ and $D_9$.

The surge voltage clamping circuit 8 according to the present invention has the following features:

(1) The circuit configuration is markedly simplified as compared with the prior-art circuit shown in FIG. 1. That is to say, the diodes $D_{10}$ and $D_{11}$, inductors $L_1$ and $L_2$, capacitors $C_1$ and $C_2$ shown in FIG. 1 are unnecessary. The diodes $D_{10}$ and $D_{11}$ are used to prevent the capacitors $C_2$ and $C_3$ from being charged reversely by the DC voltage of the rectifier 1. Since no capacitors $C_2$ and $C_3$ are provided, no diodes $D_{10}$ and $D_{11}$ are required. However, in the case the reverse blocking voltage of the GTOs $G_7$ and $G_8$ is insufficient because of a high DC source voltage, it is preferable to provide diodes at the same positions.

(2) The circuit operates stably when driving an induction motor at a high speed. Since two GTOs $G_7$ and $G_8$ are employed in order to eliminate the need of turning-off (vibration) circuit to turn off the ordinary thyristors $T_1$ and $T_2$, there exists no unstable operation caused by the vibration circuit even at high frequency range.

(3) The cost of the circuit is reduced because an ordinary DC reactor 7 can be used in place of the cumulative DC reactors 2A and 2B. In the case of the prior-art circuit, the instant the thyristors $T_1$ and $T_2$ are turned off, the energy stored in the three series-connected capacitors $C_1$, $C_2$ and $C_3$ is discharged to the GTO inverter. Therefore, a sharp transient current is supplied to the DC source terminals of the GTO inverter 3. In order to suppress such a peak current as described above, the reactor having a large inductance is required. In the circuit of the present invention, since the energy stored in the capacitor $C_1$ is discharged frequently through the GTOs $G_7$ and $G_8$ whenever the voltage charged up in the capacitor $C_1$ exceeds the DC source voltage, no sharp peak current is generated and therefore no expensive reactors $Lr_1$ and $Lr_2$ having a great inductance are required.

As described above, in the surge voltage clamping circuit for a current-type GTO inverter according to the present invention, since GTOs are turned on to restore the surge voltage energy stored in an electrolytic capacitor to the DC source terminals of the GTO inverter, only when the voltage of the capacitor exceeds a predetermined value beyond the DC source voltage, it is possible to stabilize the circuit operation at high frequency range and to simplify the circuit configuration or to reduce the circuit cost.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A current-type inverter having a surge voltage clamping circuit comprising:
    (a) a thyristor bridge-connected rectifier;
    (b) a gate turn-off thyristor (GTO) bridge-connected inverter for driving an inductive motor;
    (c) a single DC reactor connected between said rectifier and said GTO bridge-connected inverter;
    (d) a diode bridge-connected commutation surge voltage rectifier connected to said GTO bridge-connected inverter;
    (e) a capacitor connected to said diode bridge-connected commutation surge voltage rectifier for storing a commutation surge voltage energy generated when each of the thyristors of said GTO bridge-connected inverter is turned off;
    (f) a cumulative reactor having a first winding, a positive side of which is directly connected to a positive terminal of said GTO bridge-connected inverter, and a second winding, a negative side of which is directly connected to a negative terminal of said GTO bridge-connected inverter;
    (g) a first gate turn-off thyristor having a cathode connected to a negative side of the first winding of said reactor and an anode directly connected to a positive side of said capacitor, said first gate turn-off thyristor being turned on when the voltage charged in said capacitor exceeds a predetermined value beyond a direct-current source voltage;
    (h) a second gate turn-off thyristor having a cathode directly connected to a negative side of said capacitor and an anode connected to a positive side of the second winding of said reactor, said second gate turn-off thyristor being turned on when the voltage charged in said capacitor exceeds said predetermined value;
    (i) a first diode having an anode connected to the positive side of the second winding of said reactor and a cathode connected to the positive side of said capacitor; and
    (j) a second diode having an anode connected to the negative side of said capacitor and a cathode connected to the negative side of the first winding of said reactor,
    whereby the commutation surge voltage energy stored in said capacitor is restored to said GTO bridge-connected inverter through said first and second gate turn-off thyristors when the charged-up capacitor voltage exceeds said predetermined value beyond the direct-current source voltage and further magnetic energy stored in the first and second windings of said cumulative reactor is recharged to said capacitor through said first and second diodes after said first and second gate turn-off thyristors have been turned off.

* * * * *